United States Patent [19]

King

[11] 4,228,140

[45] Oct. 14, 1980

[54] PRODUCTION OF PHOSPHATES

[75] Inventor: Stephen J. King, Clearwater, Fla.

[73] Assignee: The Nash Engineering Company, Norwalk, Conn.

[21] Appl. No.: 806,391

[22] Filed: Jun. 13, 1977

[51] Int. Cl.$^2$ .............................................. C01B 25/16
[52] U.S. Cl. ................................. 423/320; 423/321 R
[58] Field of Search ............... 423/269, 316, 320, 321

[56] References Cited

U.S. PATENT DOCUMENTS

| | | | |
|---|---|---|---|
| 3,044,854 | 7/1962 | Young | 423/320 |
| 3,154,240 | 10/1964 | Jennings | 417/54 |
| 3,414,376 | 12/1968 | Banks | 423/269 |
| 3,467,162 | 9/1969 | Putnam | 423/321 |
| 3,544,269 | 12/1970 | Rushton | 423/320 |
| 3,666,413 | 5/1972 | Bergstrom | 423/320 |

*Primary Examiner*—O. R. Vertiz
*Assistant Examiner*—Gregory A. Heller
*Attorney, Agent, or Firm*—Albert C. Nolte; Edward B. Hunter

[57] ABSTRACT

Various stages of the process of producing phosphates are subject to a vacuum produced by a liquid ring pump in various materials of construction using relatively high concentrations of sulfuric acid as the compressant liquid.

14 Claims, 4 Drawing Figures

PRODUCTION OF PHOSPHATES

BACKGROUND OF THE INVENTION

This invention is concerned with the production of phosphates. The basic process involves subjecting phosphate bearing rock to a sulfuric acid treatment to produce phosphoric acid, commonly called $P_2O_5$ in the trade, and a precipitation of sulphates, particularly calcium sulphate. The phosphoric acid is then purified by subjecting it to filtration, evaporation, crystallization and other processes.

The vacuums used in these processes have been produced by steam ejectors, the steam for which is derived from the sulfuric acid plant which generates steam as a by-product. Although it is well known that the efficiency of steam ejectors, as compared with other vacuum producers is poor, the carry-over of the corrosive materials of the process to the vacuum source has discouraged the use of other vacuum producers.

When the sulfuric acid plants are new, the steam generated by them is sufficient to run the ejectors, but as the plants age and their efficiencies decrease this is no longer the case, particularly at times of peak production. To meet the steam demand of the ejectors, it has been the practice to utilize either an extra sulfuric acid plant or a donkey boiler. The capital investment, operating and maintenance costs of the additional sulfuric acid plant or donkey boiler would be considerable.

A vacuum pump capable of producing the vacuums required in the processes is a liquid ring pump such as that described in U.S. Pat. No. 3,154,240 issued Oct. 27, 1964, to Irving Callender Jennings. However, those pumps, even though much more efficient than steam ejectors, may not be used since they increase the fresh water requirements of the plant, increase the waste water volume and the waste water treatment necessary to handle this increase. Further, these pumps are subject to corrosion when constructed of cast iron.

Cast iron pumps of this kind utilized in the production of phosphates would be chemically attacked by carryover from the vacuum filter, the crystallizer and phosphoric evaporators. This enters the pumps to form chemically aggressive compounds with the water of the ring. Additionally, the gases being handled include silicon tetrafloride which also reacts with the water of the ring to produce aggressive compounds. Similarly, the third stage evaporators of conventional phosphate plants produce hydrogen fluoride which again is corrosive to cast iron when reacted with the water of the ring.

Additionally, these third stage evaporators run at higher vacuums than a liquid ring can efficiently produce using the warm sealing water available at most phosphoric acid plants, because of the vaporization of water from the ring.

According to this invention, there is provided a phosphate producing plant which includes liquid ring pumps of which those parts contacted by the liquid seal or ring liquid of the pumps is of cast iron, stainless steel or other material and the pumps are operated with a sulfuric acid ring liquid. There is also provided a method of producing phosphates which includes subjecting the various purification stages for the phosphoric acid to vacuums produced by liquid ring pumps which have a sulfuric acid ring liquid. Preferably, the method includes the recirculation of the sulfuric acid of the ring liquid back to the process system to be utilized in the treatment of the phosphate bearing rock. Alternatively, the ring liquid may be cooled and recycled to the vacuum pump with periodic additions of fresh acid to keep the proper concentration.

The corrosion rate of cast iron is low in the presence of concentrated sulfuric acid. The acid further minimizes the corrosion by absorbing water vapor from the incoming gas, to preclude formation of aggressive chemical compounds in the liquid ring. Acid concentration can be regulated to avoid dilution and subsequent corrosion of the cast iron pump.

While for cost considerations a cast iron pump is desirable, pumps of other materials—for example stainless steel—may be used in this process with sulfuric acid seal. The use of stainless steel lowers the corrosion rate still further and allows the use of warmer and less concentrated sulfuric acid compressant.

An added advantage of sulfuric acid over conventional water compressant is its lower vapor pressure. It is known that the volumetric efficiency of liquid ring pumps decreases with increasing vapor pressure of the compressant liquid—especially at higher vacuum levels. For a given temperature, the vapor pressure of sulfuric acid is very much lower than that of water. This enhances the high vacuum capability of the liquid ring pump.

Additionally, environmental problems associated with a water seal are averted by using sulfuric acid. The spent water from liquid ring pumps is contaminated with carry-over from the phosphate process and so it must be impounded or treated. On the other hand, effluent sulfuric acid may be circulated to the production line. Whatever water, chemical and solid contamination it picks up in the vacuum pump should not prevent the use of the acid for treating phosphate bearing rock. Thus, there is negligible added burden to waste treatment or impounding facilities.

BRIEF DESCRIPTION OF THE DRAWINGS

Embodiments of this invention are illustrated in the accompanying drawings in which.

DESCRIPTION OF THE PREFERRED EMBODIMENTS OF THE INVENTION

Figure 1:
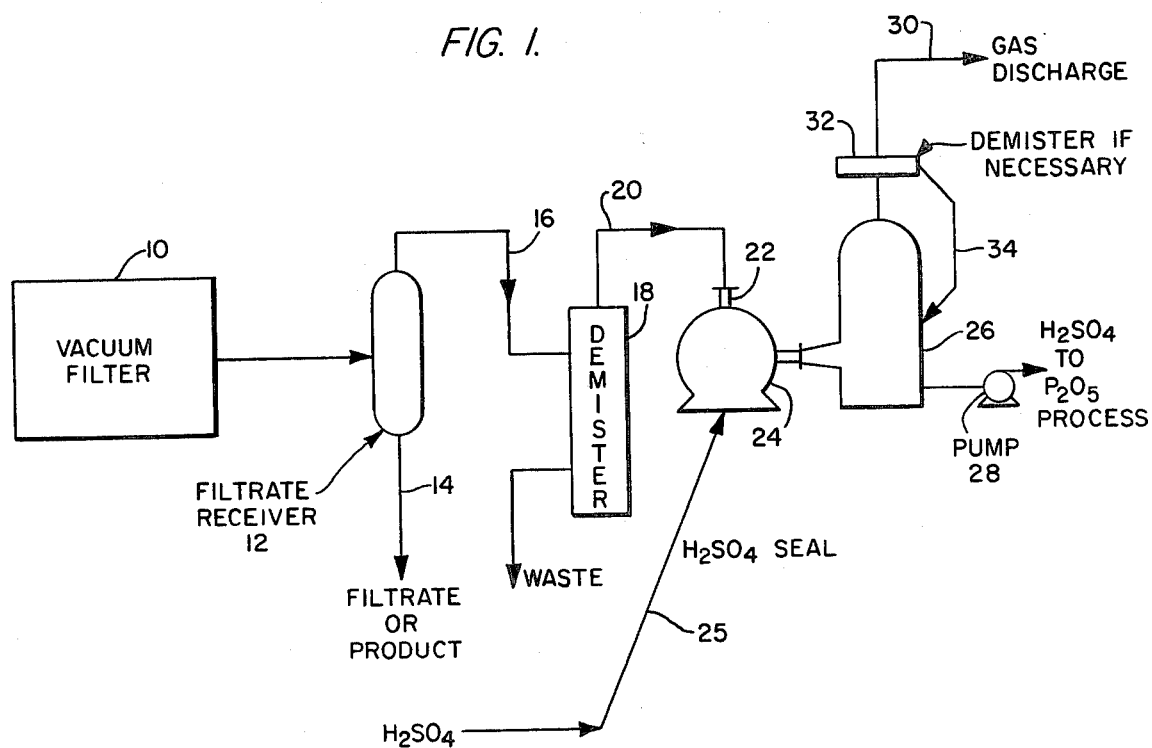
FIG. 1 shows a portion of a phosphate production line.

In FIG. 1 there are illustrated conventional parts of a phosphate production line including a vacuum filter 10 from which the filtrate is delivered to a receiver 12, filtrate or product being removed from the receiver at line 14. Line 16 extends between the receiver and a demister 18 and the demister is connected by line 20 to the suction inlet 22 of a liquid ring pump 24, the discharge of the pump being connected to a separator 26. The pump has sulfuric acid liquid delivered through line 25 and from the lower part of the separator 26 the sulfuric acid is delivered by pump 28 to the production line to be utilized in the processing of the phosphate bearing rock. From the upper end of the separator 26, a line 30 extends to atmosphere or to other treatment stages that line 30 including, if necessary, a demister 32 and a return line 34 for delivering a disentrained sulfuric acid to the separator 26.

Figure 2:
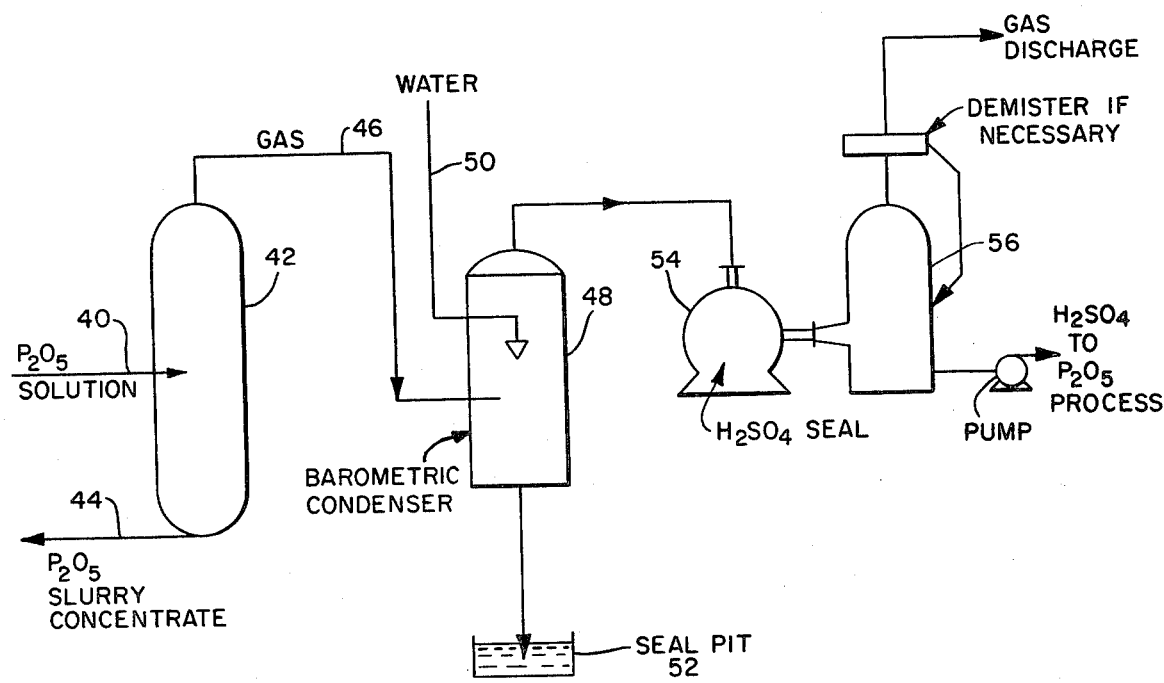
FIG. 2 shows a second portion of a phosphate production line.

FIG. 2 of the drawings illustrates typical arrangements for first, second and third stage phosphoric acid evaporators.

Phosphoric acid is delivered as a solution along line 40 to evaporator chamber 42 from the lower portion of which phosphoric acid slurry is removed as a concentrate at line 44. Vapor is passed through line 46 to a barometric condensor 48 to which water or other condensing liquid such as sulphuric acid is delivered along line 50 and from which condensate is delivered to seal pit 52. The condensor 48 is connected to the inlet of a liquid ring pump 54, the outlet of which is delivered to separator 56. As with the filter illustrated in FIG. 1 from the separator gas is delivered via an appropriate line to atmosphere, that line including a demister, if necessary, and sulfuric acid is pumped to be recycled in the rock treating process.

Figure 3:
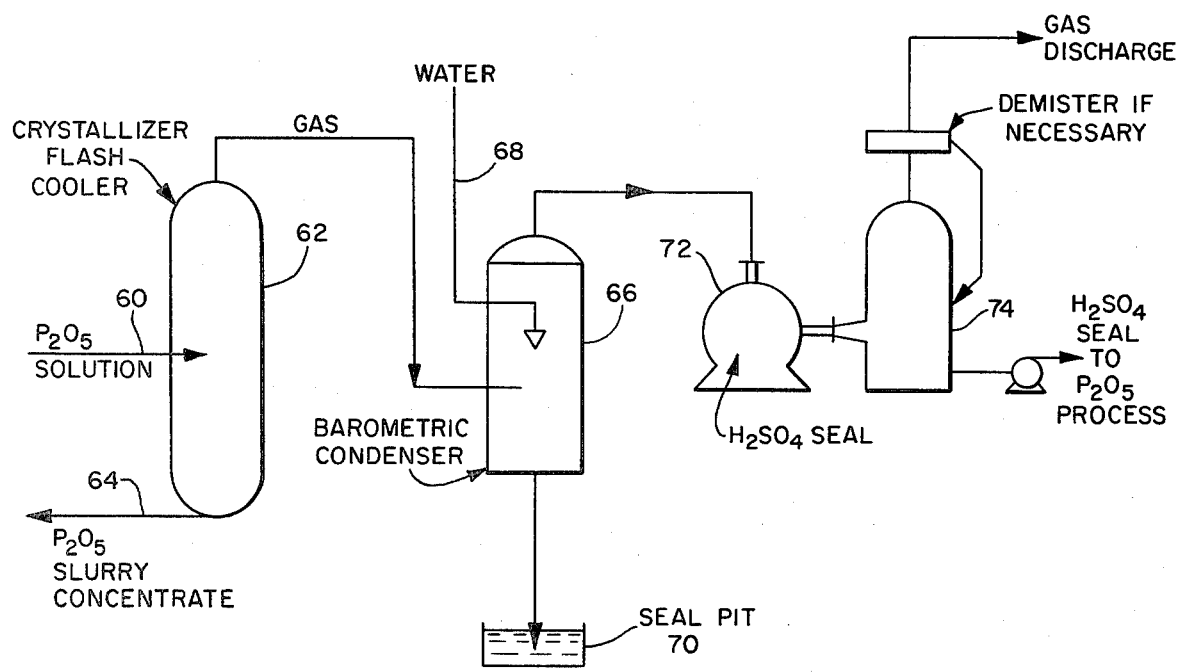
FIG. 3 shows still another portion of phosphate production line.

The embodiment of FIG. 3 shows a crystallizer or flash cooler section of a phosphate production line in which phosphoric acid solution is delivered along line 60 to the crystallizer or flash cooler 62 from which phosphoric acid slurry is removed at 64. As in the embodiment illustrated in FIG. 2, the gas from the crystallizer is delivered to a barometric condensor 66 provided with a water or other condensing liquid such as sulfuric acid line 68 and condensate is delivered to a seal pit 70. The condenser is connected to the inlet of a liquid ring pump 72 which, as in the embodiments of FIGS. 1 and 2, delivers to a separator 74 from which noncondensibles are discharged through a demister and from which sulfuric acid is returned to the process via a pump.

The utilization of sulfuric acid as a condensing liquid may be feasible in certain situations and this will appreciably reduce the overall water requirements from the system resulting in the advantages discussed supra. It will be recognized that with the conventional steam ejector the use of acid is not possible since, of course, the propellant of the ejector issues to atmosphere and would include an unacceptably polluting carryover from the condenser. By the utilization of the liquid ring pump as in this invention, this problem would not occur.

Figure 4:
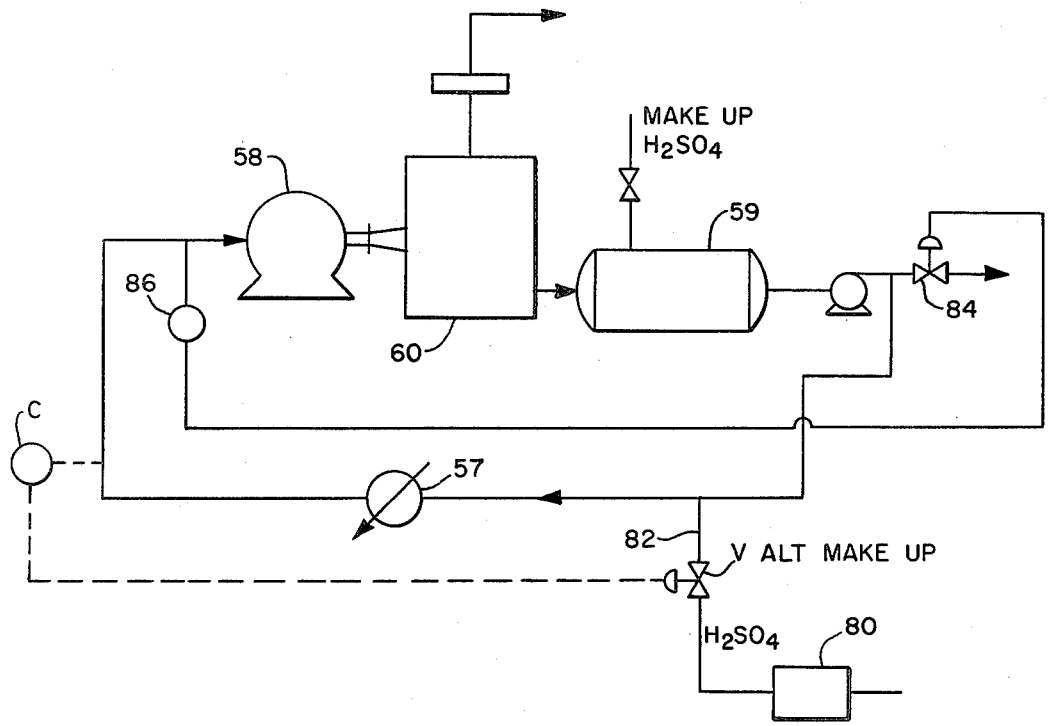
FIG. 4 shows another embodiment of the invention.

FIG. 4 illustrates an alternate technique for the handling of sulfuric acid compressant. Acid is recirculated through a cooler 57 to the vacuum pump 58. Acid concentration is maintained within acceptable limits by addition of fresh, concentrated acid on a continuous or batch basis. An acid reservoir 59 may be used to augment the liquid reserve of separator 60.

An alternative technique for maintaining the concentration of sulfuric acid re-circulated to the pump is indicated in chain line in FIG. 4. In this arrangement a supply 80 of concentrated sulfuric acid is provided and a line 82 leads from that supply to the connection between the separator and the cooler. Line 82 includes a valve V which is controlled by an acid concentration monitor C arranged to sample the concentration of acid in the line connecting the separator and pump.

It will be understood that the valve could, if desired, be manually operable. The line issuing from the separator to the cooler will include a liquid pump to provide the necessary pressure at the seal liquid inlet to the vacuum pump. To remove from that line the excess acid there is provided a pressure controlled bleed off valve 84, the outlet of which leads, most desirably, back to the process. The valve is controlled by a controller 86 which modulates valve 84 to maintain a seal liquid inlet pressure to vacuum pump 58.

The liquid ring pump of each of the embodiments herein may take the form of any of the well-known kinds, it may be a center ported pump or it may be a side ported pump, or it may be a combination of those pumps. Parts of the pump contacting the ring liquid may be of cast iron, stainless steel or other material. The ring liquid is to be sulfuric acid in concentrations chosen for minimum corrosion rate of the pump. By the adoption of this arrangement, an inexpensive plant is provided with efficient pumps not subject to the corrosive action of the materials of the process and which minimizes adverse environmental efforts. Further, this eliminates the shortcomings of the steam ejectors discussed supra.

What is claimed is:

1. In a method of producing phosphoric acid which includes subjecting a phosphate bearing rock to attack by sulfuric acid to produce a slurry of phosphoric acid and by-products, cooling the slurry by evaporation, filtering the resultant cooled slurry, and concentrating the resultant filtrate by evaporation to obtain relatively pure phosphoric acid, the improvement comprising delivering filtrate from a vacuum filter to a filtrate receiving chamber, connecting said filtrate receiving chamber to the inlet of a liquid ring pump and delivering sulfuric acid to the pump to constitute the ring liquid therefor in concentrations such that corrosion of the pump is minimized and operating said pump to cause said filtrate receiving chamber to be subject to a low pressure.

2. In the method as claimed in claim 1 the further step of returning sulfuric acid exiting said liquid ring pump after separation for use in the treatment of phosphate containg rock.

3. The method of claim 1 wherein said liquid ring pump is constructed of cast iron.

4. The method of claim 1 wherein said liquid ring pump is constructed of stainless steel.

5. In a method of producing phosphoric acid which includes subjecting a phosphate bearing rock to attack by sulfuric acid to produce a slurry of phosphoric acid and by-products, cooling the slurry by evaporation, filtering the resultant cooled slurry, and concentrating the resultant filtrate by evaporation to obtain relatively pure phosphoric acid, the improvement comprising delivering phosphoric acid solution to an evaporator, delivering vapor from the evaporator to a condensor, exposing said condensor to a vacuum produced by a liquid ring pump and delivering sulfuric acid to said liquid ring pump to constitute the ring liquid therefor, the acid being in concentration such that corrosion of said pump is minimized.

6. In the method as claimed in claim 5 the further step of returning sulfuric acid exiting said liquid ring pump for use in the treatment of phosphate containing rock.

7. The method of claim 5 wherein said liquid ring pump is constructed of cast iron.

8. The method of claim 5 wherein said liquid ring pump is constructed of stainless steel.

9. The method as claimed in claim 5 wherein sulfuric acid is delivered to a condensing liquid inlet of said condenser.

10. In a method of producing phosphoric acid which includes subjecting a phosphate bearing rock to attack by sulfuric acid to produce a slurry of phosphoric acid and by-products, cooling the slurry by evaporation, filtering the resultant cooled slurry, and concentrating the resultant filtrate bny evaporation to obtain relatively pure phosphoric acid, the improvement comprising delivering the resultant relatively pure phosphoric acid solution to a crystallizer, delivering gas produced in said crystallizer to a condensor, exposing said condensor to a vacuum produced by a liquid ring pump and delivering sulfuric acid to said liquid ring pump to constitute the ring liquid therefor, said acid being in a concentration such that corrosion of said pump is minimized.

11. In the method as claimed in claim 10 the further step of returning sulfuric acid exiting said liquid ring pump for use in a phosphate containing rock treatment.

12. The method of claim 10 wherein said liquid ring pump is constructed of cast iron.

13. The method of claim 10 wherein said liquid ring pump is constructed of stainless steel.

14. The method as claimed in claim 11 wherein sulfuric acid is delivered to a condensing liquid inlet of said condenser.

UNITED STATES PATENT AND TRADEMARK OFFICE
CERTIFICATE OF CORRECTION

PATENT NO. : 4,228,140
DATED : October 14, 1980
INVENTOR(S) : Stephen J. King

It is certified that error appears in the above—identified patent and that said Letters Patent are hereby corrected as shown below:

In the claims:

Column 4, line 36 [containg] containing

Column 5, line 2 [bny] by

Signed and Sealed this

Twenty-fourth Day of February 1981

[SEAL]

Attest:

RENE D. TEGTMEYER

Attesting Officer    Acting Commissioner of Patents and Trademarks